United States Patent [19]
Ueda et al.

[11] Patent Number: 5,487,911
[45] Date of Patent: Jan. 30, 1996

[54] PROCESSED EGG POWDER AND PROCESS FOR PRODUCTION THEREOF

[75] Inventors: Tsunesuke Ueda, Hino; Tadao Kusama, Fuchu; Kazuo Honma, Tama, all of Japan

[73] Assignee: Kewpie Kabushiki Kaisha, Tokyo, Japan

[21] Appl. No.: 279,085

[22] Filed: Jul. 22, 1994

Related U.S. Application Data

[63] Continuation of Ser. No. 879,681, May 4, 1992, abandoned, which is a continuation of Ser. No. 606,137, Oct. 31, 1990, abandoned.

[30] Foreign Application Priority Data

Oct. 31, 1989 [JP] Japan .................................... 1-283445
Jul. 17, 1990 [JP] Japan .................................... 2-188353

[51] Int. Cl.$^6$ .................................................. A23L 1/32
[52] U.S. Cl. .......................... 426/614; 426/471; 426/511
[58] Field of Search .................................... 426/471, 511, 426/614

[56] References Cited

U.S. PATENT DOCUMENTS

| | | | |
|---|---|---|---|
| 1,891,887 | 12/1932 | Clickner | 426/471 |
| 1,951,889 | 3/1934 | Tranin | 426/614 |
| 3,113,872 | 12/1963 | Jones et al. | 426/511 |
| 3,262,788 | 7/1966 | Swanson et al. | 426/614 |
| 3,930,054 | 12/1975 | Liot et al. | 426/471 |

FOREIGN PATENT DOCUMENTS

| | | | |
|---|---|---|---|
| 0089138 | 5/1983 | Japan . | |
| 0114145 | 6/1985 | Japan | 426/614 |
| 2201556 | 9/1987 | Japan | 426/614 |
| 2119756 | 5/1990 | Japan . | |

OTHER PUBLICATIONS

Fennema, O. R., Food Chemistry, 1985, pp. 274–277, Marcel Dekker, Inc., New York.

*Primary Examiner*—Jeanette Hunter
*Attorney, Agent, or Firm*—Oblon, Spivak, McClelland, Maier, & Neustadt

[57] ABSTRACT

A processed egg powder comprising water-insoluble dry egg yolk particles of substantially spherical shape and a process for producing a processed egg yolk powder, which comprises spray-drying an egg liquid containing egg yolk and thereafter denaturing the resulting dry egg powder substantially in the form as it is.

6 Claims, 2 Drawing Sheets

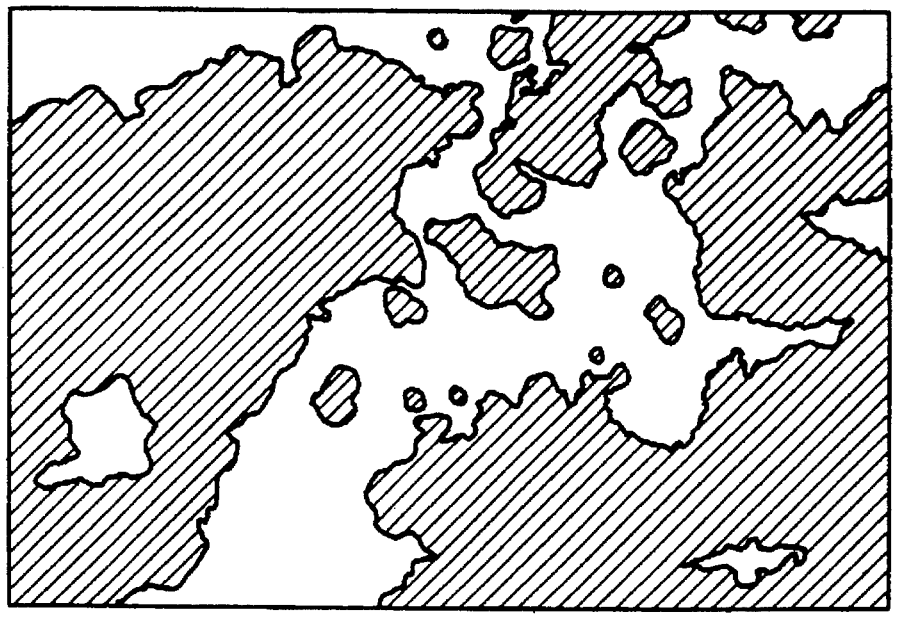
F I G. 3
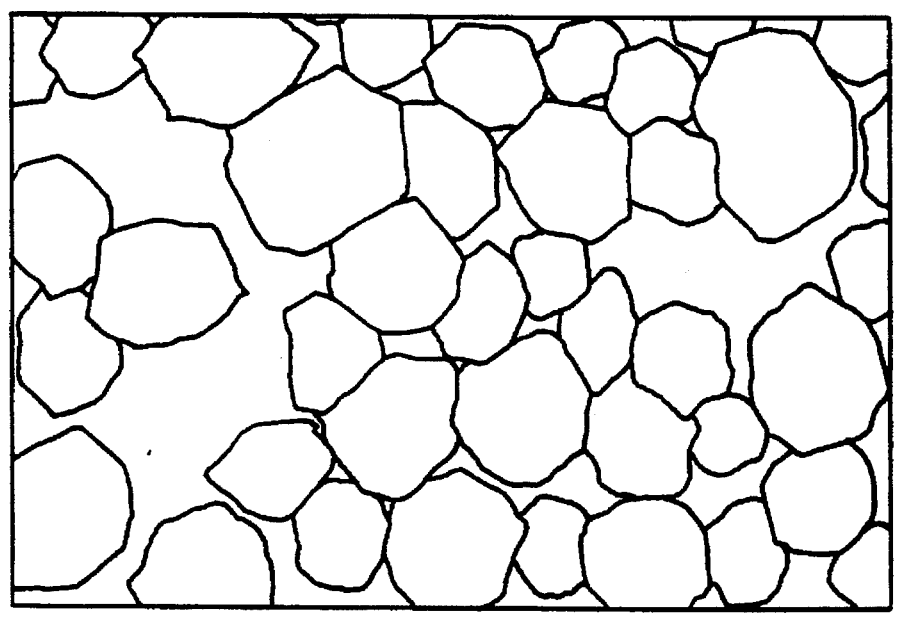
F I G. 4

PROCESSED EGG POWDER AND PROCESS FOR PRODUCTION THEREOF

This application is a Continuation of application Ser. No. 07/879,681, filed on May 4, 1992, now abandoned, which is a continuation of application Ser. No. 07/606,137, filed on Oct. 31, 1990 now abandoned.

BACKGROUND OF THE INVENTION

The present invention relates to a novel processed egg powder and a process for production thereof.

Egg yolk taken out separately from egg white of a shelled egg after it has been hardboiled generally imparts a characteristic slightly moist, crumbly or friable sensation upon being chewed (hereinafter referred to as "crumbly"). This gives the yolk a uniquely delicious taste. However, when egg yolks having such a crumbly taste are to be produced on a large scale, operations such as removing shells require much time. Further, the process must be designed to use effectively the coagulated egg white which remains after the egg yolk has been taken out. Accordingly, the following method has been tried. An egg yolk food having a crumbly taste is made with the use of an egg yolk liquid obtained by breaking the shells of eggs and isolating egg yolk instead of the use of boiled eggs as a raw material. The egg yolk liquid is heat-coagulated to obtain a coagulated egg yolk in the form, for example, of cheese, which is then pulverized to produce an egg yolk food having a crumbly taste.

However, such a method for heat-coagulating the egg yolk liquid as it is and then pulverizing the coagulated egg yolk could not eliminate the complicacy accompanying the production process, and the processed egg thus obtained did not have a satisfactory crumbly taste. In addition, when it was once dried with hot air and mixed with an appropriate amount of water (warm water), the egg yolk food obtained did not always have a satisfactory taste as is evidenced by the results of Test Example described hereinafter.

Accordingly, an object of the present invention is to provide a processed egg powder from which, when mixed with an appropriate amount of water (warm water), a food having a taste of the crumbly egg yolk isolated from a boiled shelled egg or a taste equivalent thereto, that is, the taste of an egg yolk of a hard boiled egg, can be easily produced.

SUMMARY OF THE INVENTION

We have conducted many studies for the purpose of achieving the aforementioned object, and finally have accomplished the present invention.

More specifically, the present invention provides a processed egg powder comprising an aggregate of water-insoluble dry egg particles of substantially spherical shape which contains egg yolk. The present invention further provides a process for producing a processed egg powder, which comprises spray-drying an egg liquid containing egg yolk, and denaturing the resulting dry egg powder substantially in the form as it is.

According to the present invention, there is provided a processed egg powder which gives rise to a crumbly taste merely by adding water to the powder and mixing.

According to the process of the present invention for producing a processed egg powder, the processed egg powder mentioned above can be produced easily.

BRIEF DESCRIPTION OF THE DRAWINGS

The four figures in the accompanying drawings are transcriptions based respectively on photomicrographs taken through an optical microscope, in which:

FIG. 3 is that of Comparative Product A (amorphous) produced with an egg yolk liquid as a raw material according to Test Example set forth hereinafter; and FIG. 4 is that of Comparative Product B (polyhedral) obtained from a hardboiled egg in a shell according to Test Example set forth hereinafter.

Figure 1:
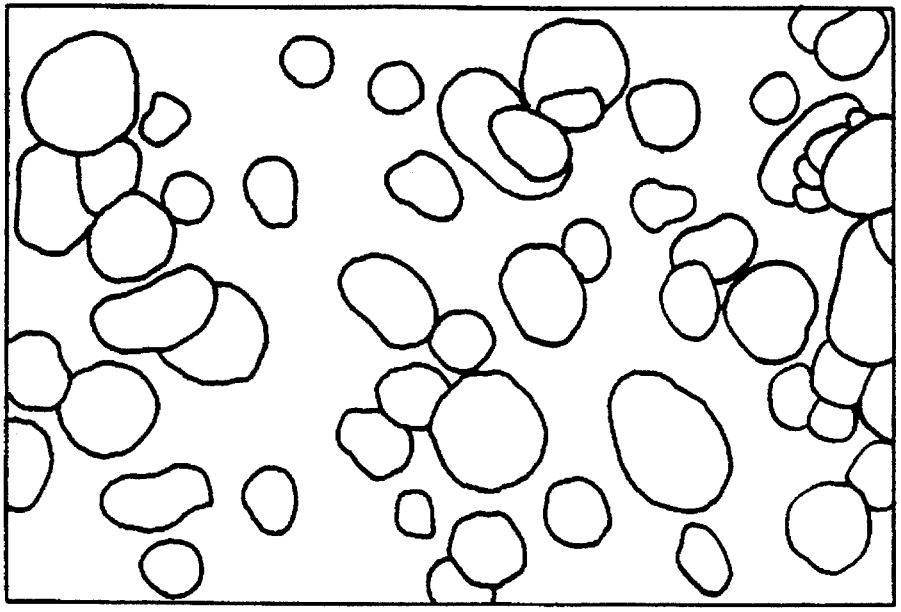
FIG. 1 is that of a processed egg yolk powder produced with an egg yolk liquid as a raw material according to Example 1 set forth hereinafter.
Figure 2:
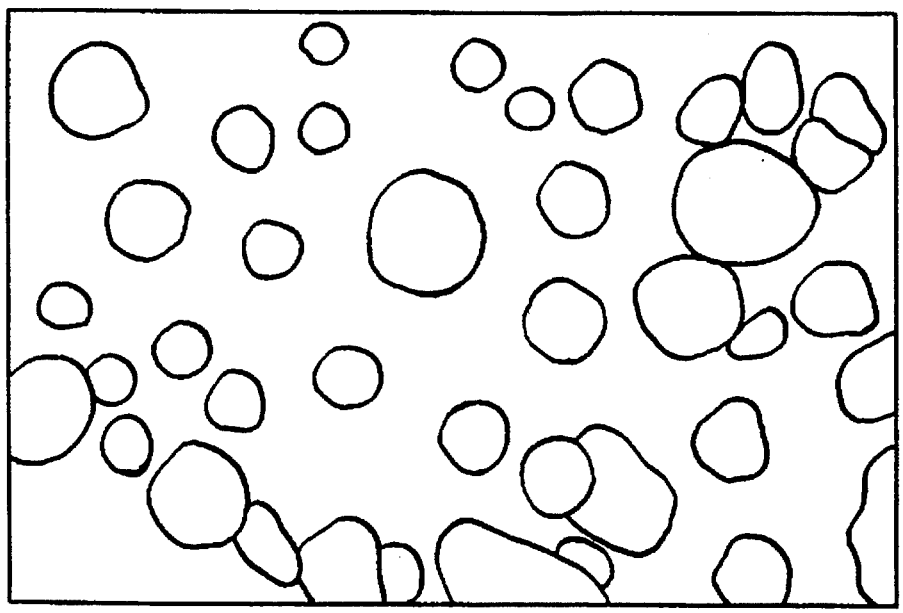
FIG. 2 is that of a processed whole egg powder produced with a whole egg as a raw material according to Example 3 set forth hereinafter.

In this connection, the products of the present invention and Comparative Product A were photographed in the state of dispersion in water in order to photograph the particles individually. However, the particles in the state of dispersion in water had the same particle size as those in the dry state.

DETAILED DESCRIPTION OF THE INVENTION

The processed egg powder of the present invention comprises an aggregate of substantially spherical, water-insoluble dry egg particles containing egg yolk.

The term "water-insoluble dry egg particles containing egg yolk" means herein particles of dry egg containing egg yolk (e.g., dry egg yolk, dry Whole egg) which are substantially water-insoluble. The term "substantially water-insoluble" means herein that when the aggregate of the dry particles is placed in a 3% saline solution in an amount of about 10 times that of the aggregate, stirred slowly for 5 minutes and left standing, about 80% or more of the aggregate sediments or surfaces without dissolution or dispersion in water. The insolubility in water of the aggregate corresponds to about 30 or less in terms of NSI (nitrogen solubility index: measured with a 3% saline solution in an amount of about 50 times that of the aggregate). The dry egg particles are thus made water-insoluble, because the processed egg powder comprising the aggregate of particles in substantially the spherical form absorbs water and gives rise to a crumbly taste when blended homogeneously with water in a weight ratio ranging from almost equality to three. In addition, in order to produce the crumbly taste in the processed egg powder mixed with water, the ratio of egg yolk to egg white in a dry egg containing egg yolk is preferably adjusted so that the egg yolk (solid content) amounts to about 50% by weight or more of the total weight of both the solid contents of the egg yolk and the egg white.

Typical examples of the water-insoluble dry egg particles containing egg yolk include dry egg yolk powder and dry whole egg powder which have been heat-denatured into water-insoluble forms. The term "dry particles" means particles in a dry state, which generally have a water content of 10% or less, preferably about 5% or less, ordinarily 3 to 5% in consideration of the storage of the processed egg powder. The dry egg particles have ordinarily an average particle diameter of 5 to 200 μm, more preferably 20 to 150 μm. If the average particle diameter is extremely small, it will be difficult to produce the crumbly taste. On the other hand, if the average particle diameter is excessively large, the particles feel rough to the tongue and are far from such a crumbly taste.

The aforementioned egg particles have a substantially spherical shape. The term "substantially spherical" refers to the particles having a shape nearly spherical as observed through an optical microscope, which includes a slightly flat sphere and a polyhedron of nearly spherical shape. However, rods having a ratio of longer diameter to shorter diameter in the range of 3 to 5 do not produce crumbly taste and thus are excluded from the concept of spherical shape.

In addition, the term "egg particles" means particles comprising egg as a main component. While the egg particles are generally those composed of egg alone, they may contain other raw materials or components within the range where they will not impair the object of the present invention. Examples of the other raw materials or components are 2 to 50% of sugar (the percentage represents, for the sake of convenience, the content in a processed egg powder; the same shall apply hereinafter), 1 to 5% of gelatin, 1 to 20% of dextrin alcohol, 1 to 10% of sodium casein, and 0.01 to 0.2% of vitamin E or the like. If sugar is contained in the egg particle, the processed egg powder will be homogeneously blended with water easily upon its use, and there is hardly any generation of oxidation odor which otherwise tends to be generated during the storage of the processed egg powder. If vitamin E is contained in the egg particle, it has the effect of preventing the generation of abnormal smells which otherwise tend to be generated during the storage of the product of the processed egg powder in a sealed container (e.g., during the storage at a room temperature of 30° C. for 1 month). In this connection, it is not desirable to incorporate vitamin C into the egg particles, as it gives rise to browning (oxidation) of the product during storage. Moreover, if gelatin, sodium casein or dextrin alcohol are incorporated into the egg particles, they have the effect of preventing the oozing out of the oily components intrinsically contained in egg yolk during the denaturation process.

The processed egg powder of the present invention comprises the aggregate of such dry egg particles. The processed egg powder of the present invention in the form of its final product may appropriately contain other foods or raw materials such as mashed potato, sugar, and raisins depending on the final applications such as potato salad and two-color egg.

According to the process of the present invention for producing a processed egg powder, an egg liquid containing egg yolk is spray-dried and thereafter the resulting dry egg powder is denatured substantially in the form as it is.

The term "an egg liquid containing egg yolk" herein means a liquid egg containing egg yolk. Typical examples thereof are an egg yolk liquid obtained by breaking the shell of an egg and removing said egg yolk liquid from the egg white, a whole egg liquid obtained by breaking the shell of an egg and homogeneously mixing the egg contents, a liquid thereof diluted with a diluent such as water, or a slightly condensed liquid thereof. These liquids may contain any other raw materials or components within the range wherein they do not obstruct the achieving of the objects of the present invention. For example, 0.5 to 5% additional amount (that is, 0.5 to 5 parts for 100 parts of an egg liquid obtained by breaking the shells of eggs, e.g., an egg yolk liquid or a whole egg liquid) of sodium casein, or 1 to 25% of sugar may be contained.

In this connection, after spray-drying, the weights of these egg liquids are reduced to about ½ to ⅓ of those prior to drying.

The term "spray-drying" means drying by spraying. Spray-drying may be conducted according to a conventional method. Typically, an egg liquid (an egg yolk liquid or a whole egg liquid) is dried by spraying it into an atmosphere at a temperature of 130° to 200° C. Thus, the egg particles become substantially spherical in shape with an average particle diameter generally in the range of 5 to 200 μm.

According to the process of the present invention, the dry egg powder particles thus obtained are denatured while they substantially maintain their shape. The term "they substantially maintain their shape" means that their shape (substantially spherical) will not be changed substantially. Any of various methods may be used for denaturation. A typical method is denaturation by heat, which preferably comprises exposing the dry egg powder to hot steam at a temperature of 80° to 120° C. for 2 seconds to 5 minutes. The egg powder may be exposed to steam by any method such as (i) spreading the egg powder in a thickness of one to several centimeters over a steamer and exposing it to steam by blowing the steam over the egg powder; (ii) spreading the egg powder over a steamer provided with a plurality of pores in a manner similar to (i), exposing it to steam by blowing the steam upward through the pores in order to prevent the egg powder from dropping through the pores, and simultaneously blowing the steam over the egg powder; or (iii) carrying out a series of operations comprising blowing the egg powder and steam simultaneously into a sealed chamber having a small volume, holding them in this chamber for a short time and then taking out the egg powder from the chamber. If superheated steam at a temperature over 100° C. is used in these operations, it is convenient for denaturing the egg powder while substantially keeping the shape of the particle, that is, while maintaining the particle in the substantially spherical shape because such trouble as adhesion of the egg yolk particles to each other or water absorption are thereby reduced. However, it is not always necessary to use superheated steam in actual practice. However, if superheated steam is not used (if ordinary steam is used), the steam is subject to condensation, and thus some means such as a cover is preferably provided over the spread egg powder to prevent dropping of the condensed water on the powder. The egg powder is preferably heated at a temperature of 100° C. or lower in consideration of the taste of the product.

The dry egg powder loses the properties of a raw egg and becomes a water-insoluble dry egg powder as a result of the denaturation treatment. Accordingly, when it is mixed for example with a substantially equal weight of water, it absorbs an ample amount of water and produces a product having a crumbly taste within a time of 30 to 60 minutes after mixing in the case where water at ambient temperature is used and within 1 to 5 minutes after mixing in the case where (hot) water heated to a temperature of 90° to 98° C. is used. Therefore, the processed egg powder of the present invention thus obtained is very convenient for applications such as the preparation of egg salad, potato salad or two-color egg because the aforementioned taste can be utilized effectively in such applications.

Furthermore, when the processed egg powder of the present invention is to be offered to the users, it can be provided in any of various forms, for example, in powder state, in the form of a premix with water according to the request of users, or as a mixture with raw materials other than water. If the mixture with water is to be stored for several days to several months before use, it is desirable to refrigerate or freeze the mixture until it is to be used.

It is not clear why the processed egg powder of the present invention gives, when blended with water of substantially equal weight to triple weight, a crumbly taste like that of the egg yolk of a boiled egg. A probable reason is that the dry egg particles having absorbed water do not adhere to each other due to their water-insoluble property, and they maintain a structure relatively similar to that of the egg yolk which has been boiled in a state of being wrapped with egg yolk membrane.

It is believed, furthermore, according to the process of the present invention for producing a processed egg powder, that by spray-drying the egg liquid containing egg yolk, the particle size of the dry egg powder can be made uniform, albeit roughly, and that further by denaturing the resulting dry egg powder substantially in the form as it is, the particles constituting the processed egg powder can be prevented from adhering to each other, so that the particles are prevented from assuming a state wherein they produce an unpleasant rough feeling.

EXAMPLE AND TEST EXAMPLE

The present invention will now be further described in detail below with respect to Examples and a Test Example, throughout which all quantities expressed in percentages and parts are by weight.

EXAMPLE 1

A 10 kg sample of an egg yolk liquid obtained by breaking the shells of eggs and removing the egg white from the egg contents was spray-dried at a blowing temperature of 175° C. The dry egg yolk powder obtained comprised substantially spherical particles having an average particle diameter of 100 μm. The dry egg yolk powder was spread to a thickness of 1 cm on a cloth laid over a steamer and was exposed to steam at 100° C. for 2 minutes to conduct heat denaturation, thereby to produce the processed egg yolk powder of the present invention. This powder was substantially water-insoluble and had an NSI of 15. The particles had almost the same spherical shape as those prior to exposure to steam. At the upper part of the steamer was provided a cover for preventing dropping of condensed water on the egg powder. The same treatment was also conducted in the following Examples 2 and 3.

EXAMPLE 2

To 10 kg of an egg yolk liquid obtained by breaking the shells of eggs and removing the egg white from the egg contents was added 3 kg of sugar. The resulting mixture was spray-dried at a blowing temperature of 160° C. The dry egg yolk powder obtained comprised substantially spherical particles having an average particle diameter of 50 μm. The dry egg yolk powder was spread to a thickness of 2 cm on a cloth laid over a steamer and was exposed to steam at 95° C. for 5 minutes to conduct heat denaturation, thereby to obtain the processed egg yolk powder of the present invention. This powder was substantially water-insoluble and had an NSI of 10. The particles had almost the same spherical shape as those prior to exposure to steam.

EXAMPLE 3

The processed egg yolk powder of the present invention (NSI:12) was obtained by repeating the procedure in Example 1 except that 10 kg of a whole egg liquid obtained by breaking the shells of eggs, removing the shells and mixing the whole contents homogeneously was used in place of the 10 kg of the egg yolk liquid in Example 1.

EXAMPLE 4

A dry egg yolk powder obtained according to the process described in Example 1 was introduced into a heating pipe, exposed to a steam atmosphere at 105° C. for 10 seconds within the pipe, and taken out from the pipe to obtain the processed egg yolk powder of the present invention (NSI: 13).

EXAMPLE 5

A dry egg yolk powder obtained according to the process described in Example 1 was introduced into a heating pipe, exposed to a superheated steam atmosphere at 130° C. for 4 to 5 seconds within the pipe, and taken out from the pipe to obtain the processed egg yolk powder of the present invention (NSI: 10).

TEST EXAMPLE

To the processed egg yolk powder obtained in Example 1 was added quickly an equivalent weight of water (temperature: 90° C.) with stirring in a mixer, and the mixture was left standing for 3 minutes (a product of the present invention). For comparison, 10 kg of an egg yolk liquid obtained by breaking the shells of eggs and removing the egg white was placed in a plastic bag which was heated in hot water at 100° C. for 10 minutes to heat-coagulate the liquid. The coagulated product was granulated, passed through a sieve, and dried with hot air. To the dry product thus obtained was added quickly an equivalent weight of water (temperature: 90° C.) in the same manner as above, and the mixture was stirred and left standing for 3 minutes (comparative product A). Egg yolk was obtained by preparing boiled eggs from shelled raw eggs in the ordinary manner and removing the shells and the egg white (comparative product B). Tastes of these products were evaluated. The results are shown in Table 1. As for the form of the particles, the product of the present invention and comparative product A were measured in the dry state.

TABLE 1

| Sample | | Product of the Present Invention | Comparative Product A | Comparative Product B |
| --- | --- | --- | --- | --- |
| Particle Form | Appearance | almost spherical | amorphous | polyhedral |
| | Average Particle Diameter (μm) | 100 | 300 | 100 |
| Taste (NSI) | | o (15) | x (5) | o (5) |

Note 1:
Symbols o and x in Table 1 have the following meanings:
o: crumbly taste
x: poor in crumbly taste and a little rough feeling
Note 2:
NSI (nitrogen solubility index) was calculated by determining the water-soluble nitrogen of a filtrate by the Kjeldahl procedure, wherein the filtrate was obtained by adding a 3% saline solution in an amount of 50 times to each sample, stirring slowly the mixture for 5 minutes, and filtering the mixture through Toyo filter paper No. 2.

What is claimed is:

1. A processed egg yolk powder consisting essentially of water-insoluble dry egg yolk particles of substantially spherical shape, wherein the insolubility in water of said processed egg yolk powder corresponds to an NSI Index of about 30 or less.

2. A processed egg yolk powder according to claim 1, wherein said dry egg yolk particles have sizes in the range of 5 to 200μ.

3. A processed egg yolk powder according to claim 2, wherein said dry egg yolk particles have sizes in the range of 20 to 150μ.

4. A processed egg yolk powder consisting essentially of water-insoluble dry egg yolk particles of substantially spherical shape containing egg yolk, wherein said powder further contains raw materials or components selected from the group consisting of sugar, gelatin, dextrin alcohol, sodium casein, vitamin E and mixtures thereof.

5. A process for producing a processed egg yolk powder, which consists essentially of spray-drying an egg yolk liquid containing egg yolk, and thereafter denaturing the resulting dry egg yolk powder substantially in the form as it is, whereupon the dry egg yolk powder has an NSI Index of about 30 of less.

6. A process for producing a processed egg yolk powder according to claim 5, wherein the denaturation is conducted by exposing the dry egg yolk powder to hot steam at 80° to 120° C. for 2 seconds to 5 minutes.

* * * * *